US008050954B2

(12) United States Patent
Leist (10) Patent No.: US 8,050,954 B2
(45) Date of Patent: Nov. 1, 2011

(54) METHOD AND SYSTEM FOR AUTOMATED MEETING SCHEDULING

(75) Inventor: Marcie L. Leist, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2282 days.

(21) Appl. No.: 10/423,465

(22) Filed: Apr. 25, 2003

(65) Prior Publication Data
US 2004/0215497 A1    Oct. 28, 2004

(51) Int. Cl.
*G06Q 10/00* (2006.01)
(52) U.S. Cl. .................... 705/7.19; 705/7.18; 705/7.24
(58) Field of Classification Search ............. 705/7.18, 705/7.19, 7.24
See application file for complete search history.

(56) References Cited

U.S. PATENT DOCUMENTS

| | | | | |
|---|---|---|---|---|
| 5,317,683 | A | 5/1994 | Hager et al. | 395/145 |
| 5,386,558 | A * | 1/1995 | Maudlin et al. | 707/104.1 |
| 5,732,399 | A | 3/1998 | Katiyar et al. | 705/5 |
| 6,035,278 | A | 3/2000 | Mansour | 705/9 |
| 6,085,166 | A * | 7/2000 | Beckhardt et al. | 705/9 |
| 6,101,480 | A * | 8/2000 | Conmy et al. | 705/9 |
| 6,608,636 | B1 * | 8/2003 | Roseman | 715/753 |
| 6,781,920 | B2 | 8/2004 | Bates et al. | 368/10 |
| 6,792,087 | B2 | 9/2004 | Abdoh | 379/90.01 |
| 6,898,569 | B1 | 5/2005 | Bansal et al. | 705/9 |
| 7,082,402 | B2 * | 7/2006 | Conmy et al. | 705/8 |
| 2002/0152108 | A1 | 10/2002 | Nishikawa et al. | |
| 2003/0149605 | A1 * | 8/2003 | Cragun et al. | 705/8 |
| 2003/0149606 | A1 | 8/2003 | Cragun et al. | 705/8 |
| 2003/0204474 | A1 * | 10/2003 | Capek et al. | 705/64 |
| 2003/0233265 | A1 | 12/2003 | Lee et al. | 705/8 |
| 2004/0064355 | A1 * | 4/2004 | Dorenbosch et al. | 705/9 |
| 2005/0038690 | A1 | 2/2005 | Hayes-Roth | 705/9 |
| 2007/0192155 | A1 | 8/2007 | Gauger | 705/8 |

OTHER PUBLICATIONS

Gessner, Steve; McNeilly, Mark; Leskee, Bill. Using electronic meeting systems for collaborative planning at IBM Rochester. Planning Review. v22n1. pp. 34-39.*
Arabesque Software: Arabesque Ships ECCO Professional and ECCO Simplicity Version 2.0; Extends ECCO SuperPIM to Workgroups. Business Wire. Apr. 14, 1994. from dialog file 810: 398993.*
Group Scheduling: Lotus Organizer 2.0 for Windows. EDGE: Work-Group Computing Report, v5, n226. Sep. 19, 1994. from dialog file 636: 2492079.*
IBM-Lotus: Calendaring is on the agenda. Computer Reseller News n714. Dec. 9, 1996. from dialog file 15: 1350402.*
Heck, Mike. Organizer Upgrade Adds Collaborative Features. InfoWorld v19n28. Jul. 14, 1997 from dialog file 15: 1468251.*
Microsoft Outlook 98, Quick Source, pp. 1 and 4, 1998.
Joe Habraken, 10 Minute Guide to Mircrosoft Outlook™ 98; book cover, Table of Contents, Lesson 13—Using the Calendar, Lesson 14—Planning a Meeting; 11 pages, 1998.
ProQuest Information and Learning. Special Edition Using Microsoft Outlook 2002. http://proquest.safaribooksonline.com/0789725142?tocview=true, Sep. 7, 2007 (17 pages), 2002.
Burke, Dorothy; "How to Use Lotus Notes 6"; Que, Mar. 4, 2003.
Tamura, Randy; "Special Edition Using Lotus Noties and Domino 5"; Que, Aug. 23, 1999.

* cited by examiner

*Primary Examiner* — Johnna Loftis (57) ABSTRACT

One aspect of the invention is a method for scheduling a meeting. An interface is provided to allow a user to input information regarding a meeting into a computer. The interface may include an alternative attendee data field to allow a user to provide alternative attendee information. The alternative attendee information may indicate whether an invitee to a meeting may send an alternate person to the meeting in place of the invitee. The alternative attendee information may be received using the interface, and then stored and associated with other data concerning the meeting being scheduled.

20 Claims, 5 Drawing Sheets

METHOD AND SYSTEM FOR AUTOMATED MEETING SCHEDULING

CROSS-REFERENCE TO RELATED APPLICATIONS

This application is related to U.S. application Ser. No. 10/423,848, filed on Apr. 25, 2003 by Marcie Leist and entitled "Method and System for Automated Meeting Scheduling."

This application is related to U.S. application Ser. No. 10/423,849, filed on Apr. 25, 2003 by Marcie Leist and entitled "Method and System for Automated Meeting Scheduling."

This application is related to U.S. application Ser. No. 10/423,850, filed on Apr. 25, 2003 by Marcie Leist and entitled "Method and System for Automated Meeting Scheduling."

TECHNICAL FIELD OF THE INVENTION

This invention relates generally to meeting scheduling and more particularly to a method and system for automated meeting scheduling.

BACKGROUND OF THE INVENTION

Large organizations, such as corporations, currently use computer software to aid in the scheduling of meetings. For example, one popular computer software package to aid in the scheduling of meetings is Microsoft Outlook. Microsoft Outlook allows a user to schedule a meeting and to invite others to the meeting. In Microsoft Outlook, the meeting invitation is sent to the electronic mailbox of each invitee. Each invitee may accept, tentatively accept, or reject the invitation to the meeting. If the invitation is accepted or tentatively accepted, then the meeting may be electronically entered into an electronic calendar also associated with Microsoft Outlook. Other calendaring programs may check the availability of invitees to attend a meeting based on the invitees' electronic calendars and automatically schedule the meeting if the invitees are available during a particular timeslot without sending an invitation to such invitees. Existing automated meeting-scheduling systems, however, lack certain desirable features that may be useful for scheduling meetings.

SUMMARY OF THE INVENTION

One aspect of the invention is a method for scheduling a meeting. An interface is provided to allow a user to input information regarding a meeting into a computer. The interface may include an alternative attendee data field to allow a user to provide alternative attendee information. The alternative attendee information may indicate whether an invitee to a meeting may send an alternate person to the meeting in place of the invitee. The alternative attendee information may be received using the interface, and then stored and associated with other data concerning the meeting being scheduled.

The invention has several important technical advantages. Various embodiments of the invention may have none, one, some, or all of these advantages without departing from the scope of the invention. The invention allows a meeting invitation to include additional information potentially useful to those being invited to the meeting. Because this information may be provided with the meeting request, it may decrease the number of telephone calls made to the person who sent the invitation to the meeting. In addition, by including one or more data fields for particular types of information associated with a meeting, the invention encourages those sending out meeting invitations to provide this information and allows a structured and consistent format to provide such information to invitees, thus allowing invitees to more quickly process meeting invitation information.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1 through 5 of the drawings, like numerals being used for like and corresponding parts of the various drawings.

Figure 1:
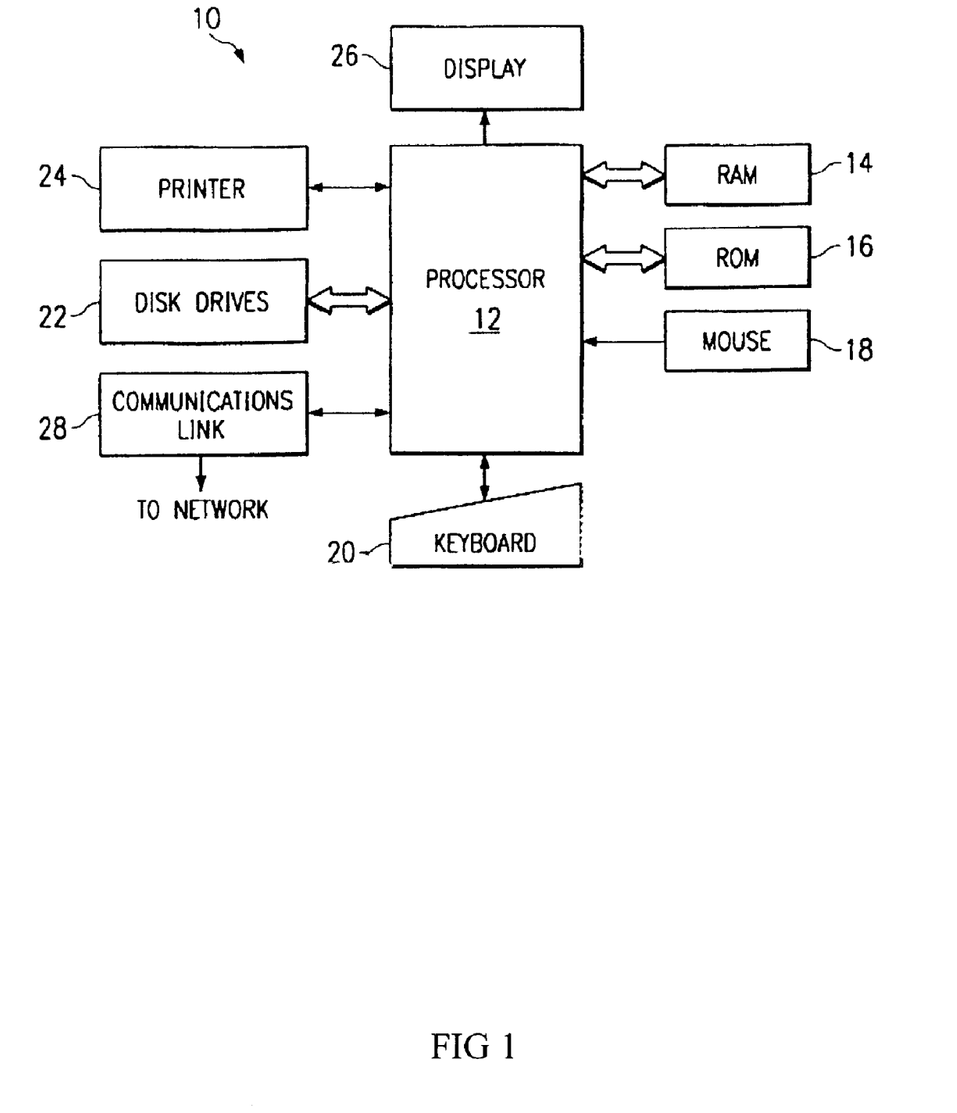
FIG. 1 illustrates a block diagram of a general-purpose computer that may be used in accordance with the present invention.

FIG. 1 illustrates a general-purpose computer 10 that may be used for automated meeting scheduling in accordance with the present invention. Specifically, general-purpose computer 10 may comprise a portion of an automated meeting-scheduling system and may be used to execute applications comprising meeting-scheduling software such as, for example, Microsoft Outlook. General-purpose computer 10 may be adapted to execute any of the well-known OS2, UNIX, Mac-OS, LINUX, and Windows operating systems or other operating systems. General-purpose computer 10 comprises processor 12, random access memory (RAM) 14, read only memory (ROM) 16, mouse 18, keyboard 20 and input/output devices such as printer 24, disk drives 22, display 26 and communications link 28. The present invention may include programs that may be stored in RAM 14, ROM 16, or disk drives 22 and may be executed by processor 12. Communications link 28 may be connected to a computer network but could be connected to a telephone line, an antenna, a gateway, or any other type of communication link. Disk drives 22 may include a variety of types of storage media such as, for example, floppy disk drives, hard disk drives, CD-ROM drives or magnetic tape drives. Although this embodiment employs a plurality of disk drives 22, a single disk drive 22 could be used without departing from the scope of the invention. FIG. 1 provides one example of a computer that may be used with the invention. The invention could be used with computers other than general-purpose computers as well as general-purpose computers without conventional operating systems.

The invention includes logic contained within a medium to facilitate automated meeting scheduling. In this example, the logic comprises computer software executable on a general-purpose computer. The medium may include one or more storage devices associated with general-purpose computer 10. The invention may be implemented in computer software, computer hardware, or a combination or software and hardware. The logic may also be embedded within any other medium without departing from the scope of the invention.

The invention may employ multiple general-purpose computers 10 networked together in a computer network. Most commonly, multiple general-purpose computers 10 may be networked in a client server network. The invention could also be used in combination with a series of separate computer networks each linked together by a private or public network.

Figure 2:
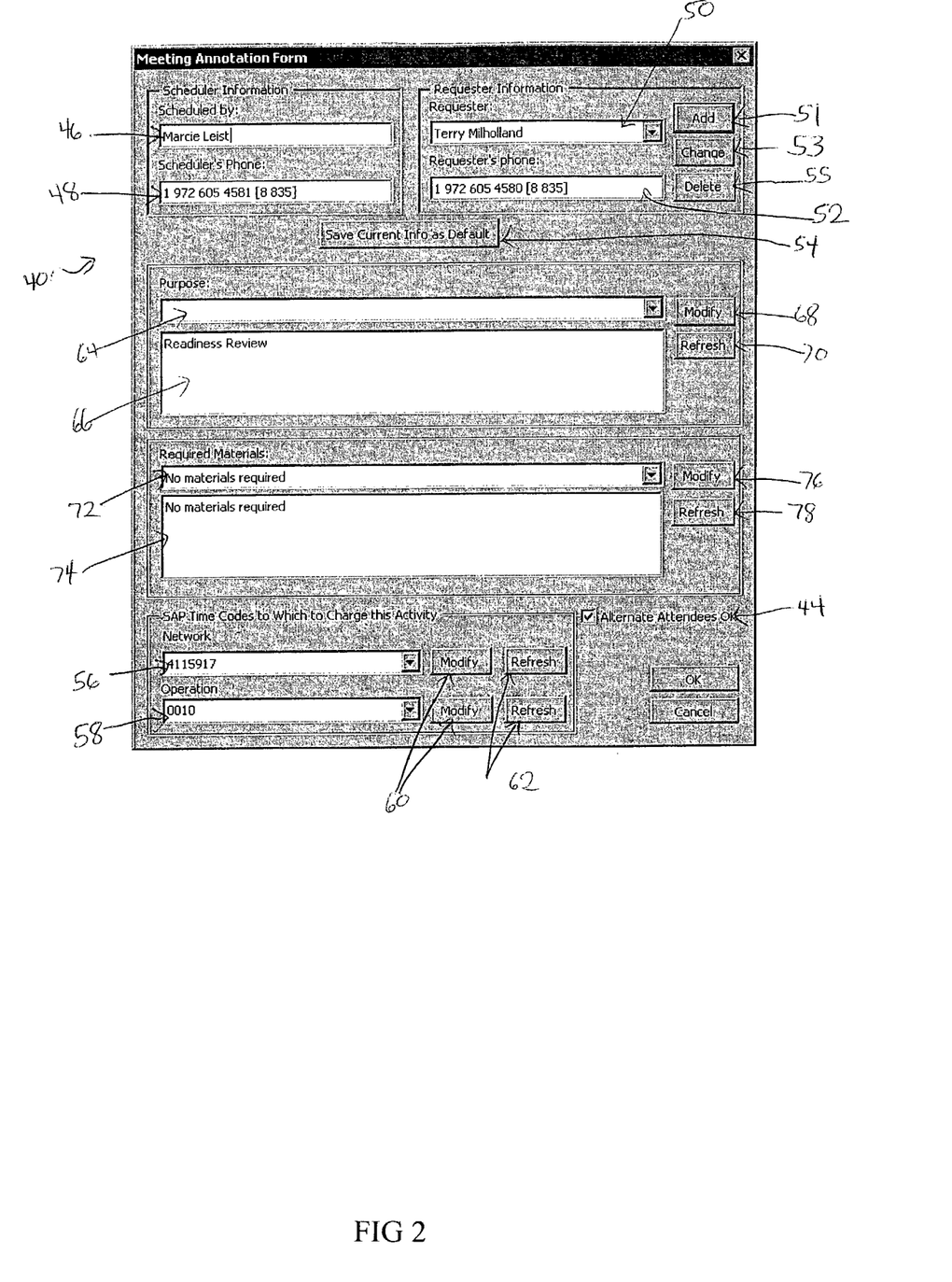
FIG. 2 illustrates an example of a meeting annotation form that may be used in connection with one embodiment of the present invention.
Figure 3:
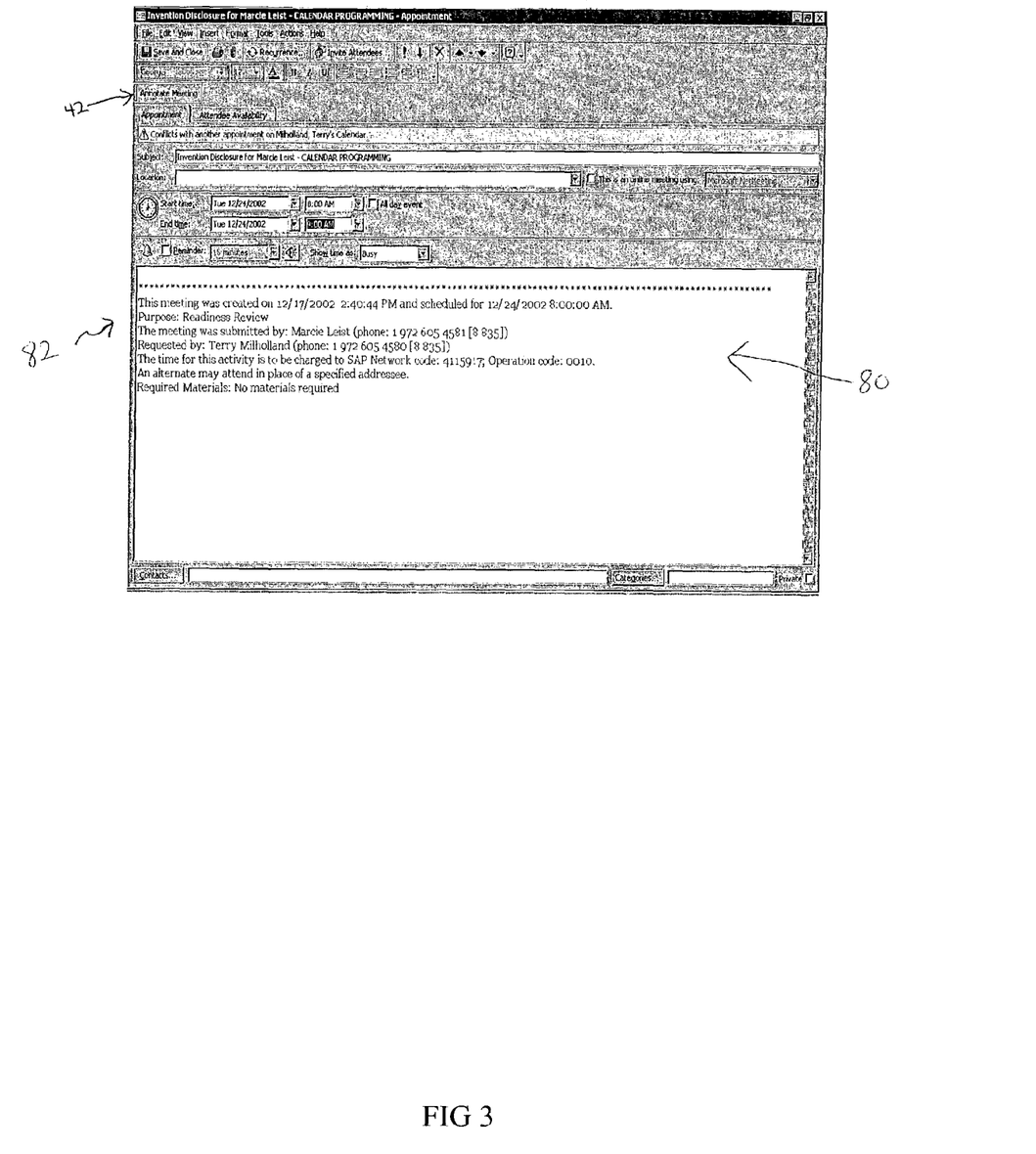
FIG. 3 illustrates an example meeting request with annotation information that was generated with one embodiment of the invention.

FIG. 2 illustrates an example meeting annotation form 40 that may be used in connection with one embodiment of the invention. Referring briefly to FIG. 3, meeting annotation form 40 may be displayed on a computer screen in response to the user's activation of annotate meeting button 42. In this embodiment, annotate meeting button 42 appears on meeting request 82 which was generated using Microsoft Outlook. Annotate meeting button 42 and meeting annotation form 40 may supplement the automated meeting scheduling functionality provided by Microsoft Outlook. Any suitable technique may be used to incorporate the features of the invention into Microsoft Outlook or any other automated meeting-scheduling software. In this example, Visual Basic for Applications was used to create the logic to generate annotate meeting button 42, meeting annotation form 40, and update annotation form 84.

Meeting annotation form 40 may include a plurality of data fields that allow a user to provide detailed information associated with a meeting request. Some of the illustrated data fields may be omitted and other data fields may be added without departing from the scope of the invention. Although this embodiment uses a separate meeting annotation form 40 activated by annotate meeting button 42, some or all of the data fields (or other data fields gathering other or similar information) could be provided in connection with a single meeting request window or divided among a plurality of meeting request windows used to gather information about a meeting.

The term "meeting request" is meant to refer broadly to a collection of data concerning a meeting that may be used in connection with electronic scheduling of the meeting. The term encompasses a collection of data associated with a meeting automatically scheduled by automated meeting-scheduling software wherein the meeting is scheduled without sending an invitation allowing a user to accept, tentatively accept, or reject the invitation to the meeting. The term also encompasses a collection of data associated with a meeting automatically scheduled using an application, such as Microsoft Outlook, which sends meeting requests to invitees and includes the meeting on an invitee's electronic calendar in response to an acceptance of the invitation. Thus, the invention extends to systems where computer software automatically enters a meeting on an invitee's calendar if the invitee has the timeslot open on his or her calendar as well as to systems like Microsoft Outlook that send electronic meeting invitations and enter the meeting on an invitee's calendar in response to an acceptance. The invention could also be used with other types of automated meeting-scheduling systems.

One data field that may be included with the present invention is alternative attendees data field 44. In this embodiment, alternative attendees data field 44 comprises a check box that allows a user to indicate whether or not alternate attendees may attend the meeting. In certain cases, particularly in large organizations, it may be acceptable for an invitee to a meeting to send an alternate as his or her representative. For example, it may be acceptable for the president of a corporation to send an administrative assistant to the meeting where the president was invited to the meeting directly. By including information indicating whether or not alternative attendees may attend the meeting, the present invention may decrease the number of phone calls placed to the person who organized the meeting with respect to whether or not it is acceptable to send alternates to the meeting. Thus, the invention may increase productivity.

In this embodiment, the alternative attendee data field 44 comprises a check box. Alternatively, alternative attendee data field 44 could comprise a text box, pick list, or any other type of data field commonly used in graphical user interfaces to allow a user to input information, so long as the alternative attendee data field 44 may receive input information indicating whether or not it is acceptable to send alternates to a meeting.

In addition, variations of the type of information collected are possible. For example, in this embodiment, alternative attendee data field 44 indicates whether or not it is acceptable for all invitees to a meeting to send alternates to the meeting. Alternatively, a check box or other type of alternate attendee data field could be provided for each invitee to the meeting. For some invitees, it may be acceptable for alternates to attend and for other invitees it may not be acceptable for alternates to attend the meeting. For example, a president of a corporation may want certain vice presidents to attend the meeting (rather than alternates), while for other vice presidents it may be acceptable to send alternates to a particular meeting. Thus, some embodiments of the invention will allow the user to provide alternate attendee information in an alternate attendee data field associated with a particular invitee. For example, a check box could be included on meeting annotation form 40 next to the name (or other identifier) of each invitee to the meeting.

Alternatively, the alternative attendee data field 44 could include a box to list the electronic mail addresses (or other identifiers) of invitees who may send alternates to the meeting. In some embodiments, this box will be similar to the box used to list invitees to the meeting or to a box in an electronic mail program, such as Microsoft Outlook, list addressees of an electronic mail message. A similar box could be provided to list those attendees who may not send alternative attendees to the meeting. Alternatively, a box could be provided to list invitees who may send alternates and the software could automatically designate all other invitees as being required to attend the meeting. Similarly, a single box could be provided to list those invitees who may not send alternates while the software automatically designates all other invitees as invitees able to send alternate representatives to the meeting.

In other embodiments, meeting annotation form 40 may allow the user to designate alternate attendee information as private. In such an embodiment, the person organizing the meeting could be concerned about problems that may be created within the organization if all invitees to a meeting know who is allowed to send an alternate to the meeting and who is not allowed to send an alternate to the meeting. Where such concerns are present, some embodiments may allow the meeting organizer to designate the alternate attendee information as private such that a specific invitee to a meeting is only provided with information as to whether it is acceptable for that particular invitee to send an alternate to the meeting. A global alternative attendee privacy data field could be provided (not explicitly shown) which comprises a check box or pick list or some other type of data field to allow the meeting organizer to designate all alternate attendee information as private. Alternatively, privacy could be indicated with respect to each individual invitee to the meeting. Thus, alternative attendee information could be shared with certain invitees to the meeting and not shared with other invitees.

In this embodiment, meeting annotation form 40 also provides data fields to include scheduler information and requester information. Often, existing meeting-scheduling software only identifies an electronic mail address of the user of the software that sent out a meeting invitation or otherwise organized the meeting. Because certain personnel in large organizations may schedule meetings both for themselves and for one or more additional people, the inclusion of only an identifier of the meeting organizer may cause confusion and increase the number of explanatory phone calls made to the meeting organizer. In this embodiment, meeting annotation form 40 allows both the person requesting that the meeting be scheduled (meeting requester) and the person performing the scheduling (meeting scheduler) to be identified. In some cases, an invitee may wish to ask questions concerning details about the meeting. Some details may be more appropriate to discuss with the scheduler of the meeting while other details may be more appropriate to discuss with the person requesting the meeting. By providing both the scheduler and requester information, the invention may decrease the number of unnecessary phone calls to the person who sends the invitation to the meeting.

This embodiment includes several meeting scheduler and meeting requester data fields. As will be discussed below, some of these data fields could be omitted or changed without departing from the scope of the invention and other scheduler and requester data fields could be included without departing from the scope of the invention.

In this embodiment, scheduler information data fields include scheduler name data field 46 and scheduler phone data field 48. Each of these fields are meeting scheduler data fields and allow a user to provide scheduler information to identify a person scheduling the meeting. If desired, the invention could include some or all of the same data fields for a plurality of meeting schedulers or a plurality of meeting requesters. In this embodiment, the scheduler name data field 46 is used to enter the name of the meeting scheduler while the scheduler phone data field 48 is used to enter the phone number of the meeting scheduler.

Each of these data fields (as well as the similar data fields for the requester) could be text boxes or pick lists or any other appropriate type of data field used with a graphical user interface. In this embodiment, scheduler name data field 46 comprises a pick list of meeting scheduler names. The invention may automatically associate a scheduler phone number in scheduler phone data field 48 with a particular name on the pick list comprising scheduler name data field 46. Alternatively, some or all of this information could be manually entered and the software does not necessarily have to associate a particular phone number with a particular scheduler name.

To add, change, or delete names in scheduler name data field 46, the user may place the cursor within scheduler name data field 46 and press add button 51 (typically by pressing a mouse button) to add a new name to the scheduler pick list, change button 53 to change a name on the pick list, or delete button 55 to delete a name from the pick list. In this embodiment, where a name is to be added or changed, the software will also allow an associated phone number to be added or changed along with the name.

Frequently, some or all of the scheduler and requester information will be the same for a series of meeting requests. Accordingly, the invention allows scheduler and requester information to be saved as a default by pressing save-current-information-as-default button 54. Where default information has been saved, the information will automatically appear on a new meeting annotation form 40 when annotate meeting button 42 is pressed in connection with a meeting request. Other mechanisms may be used to save information as a default or to add, change, or delete scheduler or requester information without departing from the scope of the invention. In addition, some of these functions could be excluded or other functions included without departing from the scope of the invention.

In this embodiment, requester information includes requester name data field 50 and requester phone data field 52. While requester name data field 50 operates substantially identically to scheduler name data field 46 and while requester phone data field 52 operates substantially identically to scheduler phone data field 48, these data fields could operate differently from the respective scheduler data fields without departing from the scope of the invention. In addition, the particular data fields provided for the scheduler and the particular data fields provided for the requester could be different without departing from the scope of the invention.

In this embodiment only two meeting scheduler data fields and two meeting requester data fields are provided. In other embodiments, additional meeting scheduler and meeting requester data fields may be provided. Alternatively, the name and/or phone number data fields may be omitted without departing from the scope of the invention. Additional data fields that may be included to provide scheduler information may include fields for the scheduler e-mail address, the requester e-mail address, multiple e-mail addresses for the scheduler, multiple e-mail addresses for the requester, job title (or position) of the scheduler, job title (or position) of the requester, multiple phone numbers for the scheduler, multiple phone numbers for the requester, a mailing address for the scheduler, a mailing address for the requester, multiple mailing addresses for the scheduler and/or multiple mailing addresses for the requester. Such information could be collected using any acceptable input mechanism used in a graphical user interface or other interface. While this invention employs a graphical user interface, any type of interface (including without limitation a voice recognition interface in combination with a graphical user interface) could be used without departing from the scope of the invention.

In the illustrated example, the scheduler and requester are different people. This may commonly be the case when an assistant schedules meetings for one or more superiors. However, the meeting scheduler and meeting requester could be the same person without departing from the scope of the invention.

Some organizations may include some or all of a person's name, job title (or position), phone number, e-mail address, and/or mailing address in a directory or other database. This directory or database may be stored on a general-purpose computer 10 or on another computer, such as a server computer, that is coupled to general-purpose computer 10 through one or more computer networks. To allow a meeting scheduler to complete the scheduler or requester information, the invention may allow some or all of the previously listed information to be obtained from a database accessible using Microsoft Outlook or whatever software application is used to generate meeting annotation form 40. In such a circumstance, when information is added or changed using add button 51 or change button 53, the database of information regarding particular persons may be accessed and the information updated using that database.

In this embodiment, meeting annotation form 40 also includes one or more data fields to provide billing and/or time recording information. In this embodiment, a network code data field 56 and an operation code data field 58 are provided to enter billing and/or time recording codes. Specifically, this embodiment allows the entry of an SAP time recording network code in network code data field 56 and an SAP time recording operation code in operation network code data field 58. While this embodiment uses SAP time recording codes, any type of billing and/or time recording codes could be used without departing from the scope of the invention. Similarly, rather than employing billing and/or time recording codes to identify a particular matter which the meeting should be charged to, textual information about a particular matter (e.g. the Smith account) could be provided in an appropriate billing information data field to identify a matter to which participants in the meeting may bill their time.

In this embodiment, each of network code data field 56 and operation code data field 58 comprise pick lists. Other appropriate types of data fields, such as text data fields, could be used without departing from the scope of the invention. In this embodiment to add additional billing and/or time recording codes to the pick lists, the user may press modify button 60. Pressing modify button 60 will allow the user to add or delete billing codes to either network code data field 56 or operation code data field 58 depending upon which modify button 60 is pressed. Pressing the refresh button 62 will update the pick lists to include the changes that were made during the modification process. This will allow updating of the meeting annotation form to include the new information added to the network code data field 56 and/or operation code data field 58.

While in this example two billing information data fields are used to provide billing information, more data fields or less data fields could be used for billing information without departing from the scope of the invention.

In some embodiments, multiple billing codes may be associated with a meeting. In such embodiments, multiple billing codes could be designated using appropriate data fields provided on meeting annotation form 40.

In this embodiment, meeting annotation form 40 includes alpha-numeric billing codes. However, network code data field 56 and/or operation code data field 58 may be modified to include text which is descriptive of the account to which the billing code is applicable. Similarly, a separate data field could be provided for such descriptive text. In an embodiment that includes descriptive text, the descriptive text could be entered by the user using a meeting annotation form 40 or could be retrieved from a database or other storage area accessible to meeting annotation form 40. Such a database or storage area could be resident on general-purpose computer 10 or on a computer, such as a server, coupled to general-purpose connector 10 through one or more computer networks or otherwise.

Meeting annotation form 40 may also include a meeting purpose identifier data field 64 and a purpose description data field 66. These data fields may be used to convey the purpose of the meeting to invitees to the meeting. In this embodiment, meeting purpose data field 64 comprises a pick list of purposes for various meetings. Persons who frequently schedule meetings may include the same purpose for many different meetings that they schedule. The use of a pick list avoids the need to type the purpose for the meeting repeatedly as similar meetings are scheduled. Other types of data fields, such as a text box, could be used for meeting purpose data field 64 without departing from the scope of the invention. The pick list comprising meeting purpose data field 64 may be modified by pressing modify button 68 and making appropriate additions, deletions, or alterations to the pick list. Following such modification, refresh button 70 may be pressed to update the pick list and allow the current meeting annotation form 40 to use the updated pick list.

Purpose description data field 66 comprises a text box wherein the user can add additional information about the purpose of the meeting. For example, if the general-purpose of the meeting is identified by meeting purpose data field 64, purpose description data field 66 may be used to add additional information where the purpose varies slightly from a central purpose of the meeting that recurs frequently. Further explanation may also be provided, if desired by the user of meeting annotation form 40.

Similarly, meeting annotation form 40 includes data fields to identify the required materials for a meeting. Required materials data field 72 may comprise a pick list of messages concerning materials to bring to a meeting along with other standard messages related to materials, such as the illustrated message that no materials are required. A pick list may be used so that a person who frequently schedules a similar kind of meeting does not have to retype the materials required for the meeting where those materials are likely to be the same for each instance of the similar meeting. The required materials pick list may be modified and refreshed using modify button 76 and refresh button 78 in the substantially identical manner to the way the pick list for meeting purpose is modified, as discussed above. While this embodiment uses a pick list for the list of required materials, an ordinary text box or other type of data field could be used without departing from the scope of the invention. Required materials text data field 74 comprises a text field wherein additional details may be included regarding required materials. Sometimes, even if a standard set of materials is required there may be additional materials required. Such materials could be specially listed here without updating the pick list for required materials data field 72. In addition, other details about required materials could be provided in required materials text data field 74.

In operation, the user of the invention indicates that they would like to generate a new meeting request. The user may fill out information on the meeting request form 82 as illustrated in FIG. 3. In addition, the user may input meeting annotation information by pressing annotate meeting button 42 and filling in meeting annotation form 40. This patent has referred in several places to pressing buttons on a graphical user interface. This can be done in any manner without departing from the scope of the invention but will typically be done by placing a cursor over the illustrated button and pressing a button on a mouse or other input device.

Information may be entered into a meeting request form (including the meeting annotation form 40) in any order desired by the user so long as that order is possible. For example, in an embodiment that allows the meeting organizer to indicate on an invitee-by-invitee basis whether or not it is acceptable to allow alternates to attend the meeting in place of the invitee, the invitee list will likely be entered prior to entering the information about alternate attendees. However, a partial list could be prepared, alternate attendee information provided, and subsequent invitees added to the list followed by additional alternate attendee information.

After all of the appropriate information has been added, in this embodiment, the user may click the OK button on meeting annotation form 40. At this point, this embodiment generates text consistent with meeting annotation form 40 to be included in text field 80 of meeting request form 82. When an invitee receives the meeting request form, the text from the annotation will be included in the text field 80 of the meeting request form. In this embodiment, the text comprises plain ASCII text. However, the text could also comprise particular data fields associated with the meeting request that may appear in particular places in a window associated with the meeting request form. When the meeting request form is completed, the meeting request form may be sent to invitees by the person who completed the meeting request form. When the meeting request form is received by invitees, in this embodiment, the invitee may accept, tentatively accept, or reject the invitation. If the invitation is rejected, the person who sent the meeting request form may be notified of the rejection. Alternatively, this notification could be omitted without departing from the scope of the invention. If the meeting is accepted or tentatively accepted, the person sending the invitation may be notified or, optionally, not notified of the acceptance without departing from the scope of the invention. In addition, acceptance of a meeting request may cause the meeting request to be automatically entered in an electronic calendar associated with the invitee. Alternatively, the invitee could manually enter the data on a calendar without departing from the scope of the invention.

Figure 4:
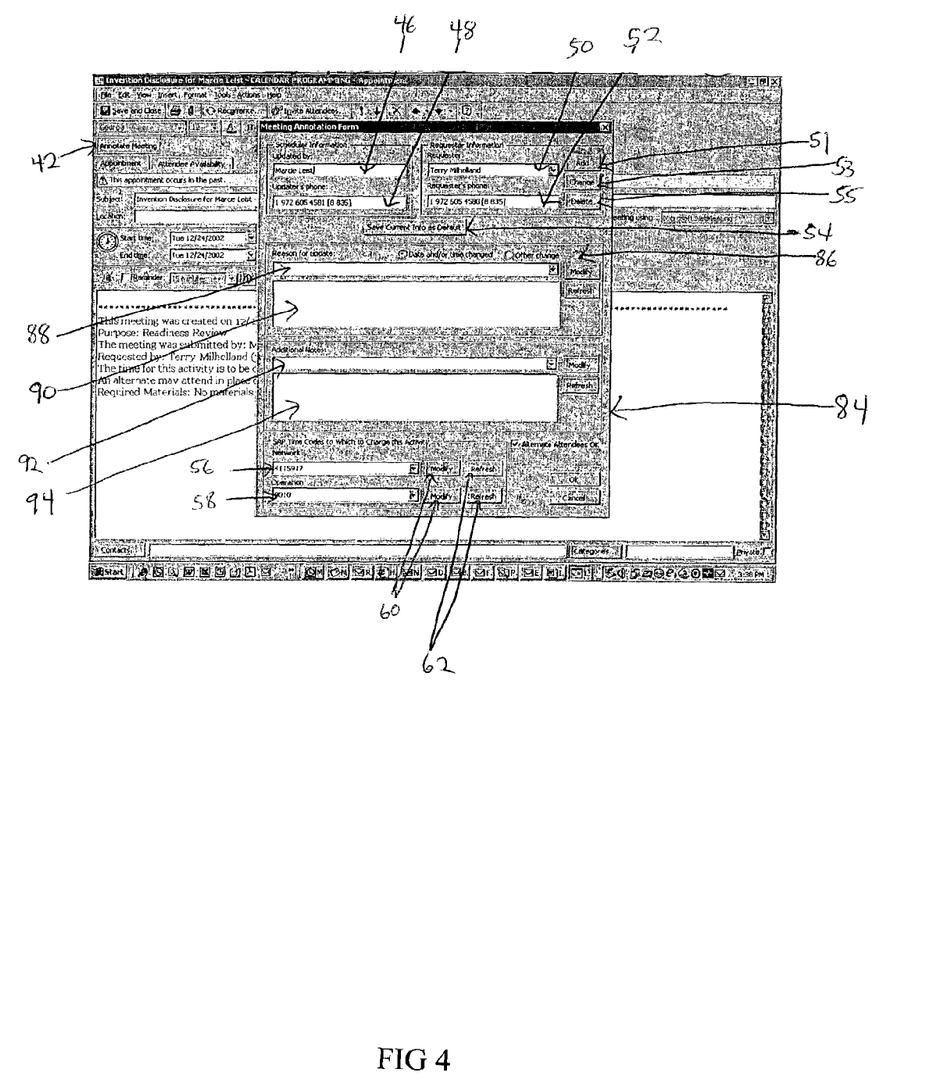
FIG. 4 illustrates an example meeting update annotation form that may be used in connection with one embodiment of the invention.

FIG. 4 illustrates an example meeting update annotation form 84 comprising one embodiment of the invention. In addition to containing some of the data fields associated with meeting annotation form 40, meeting update annotation form 84 may include additional data fields. The options discussed above with respect to data fields concerning meeting annotation form 40 also may be applied to meeting update annotation form 84.

Meeting update annotation form 84 may be used when any information associated with a previously sent meeting request is to be changed. Information could be changed, added, or deleted using meeting update annotation form 84. For example, if the meeting needs to be rescheduled, then meeting update annotation form 84 could be used to explain the reason why the meeting was changed. If the alternate attendee information, required materials information, or billing code information is changed then such information could also be changed using meeting update annotation form 84. The scheduler or requester of the meeting may change before the meeting is held. In this case, the scheduler and/or requester information may be changed using meeting update annotation form 84.

In this embodiment, meeting update annotation form 84 includes reason-for-update data field 88 and reason-for-update text data field 90. Collectively, these two data fields may be used to indicate the reason that an updated meeting request form is being sent. In this embodiment, reason-for-update data field 88 comprises a pick list with a series of recurring reasons for updating a meeting request (e.g. meeting cancelled, participants sick, customer cancelled meeting, key attendees not available, etc.). If further explanation is needed then reason-for-update text data field 90 may be used to include text describing the additional reasons or otherwise providing additional information. As was the case with meeting purpose data field 64 and required materials data field 72, the pick list for reason-for-update data field 88 may be modified by pressing the associated modify button and the refresh feature may be invoked by pressing the associated refresh button. These buttons may operate in a form substantially identical to the modify and refresh buttons associated with meeting purpose data field 64. While multiple data fields are used in this embodiment to describe the reason for a meeting update, a single data field or any combination of multiple data fields could be used for such a purpose.

In this embodiment, an update indicator data field 86 is also provided on meeting update annotation form 84. Update indicator data field 86 allows the user to indicate that only the date and/or time of the meeting has changed or that other changes to the data associated with the meeting request have occurred. In this embodiment, this function is accomplished with a field that allows the user to select the options of "date and/or time change" or "other change." In other embodiments, a series of reasons for the change may be added without departing from the scope of the invention. In this embodiment, the indicator may allow the recipient of an updated meeting request to quickly determine if only the date and/or time of the meeting has changed or whether there have been other changes. If only the date and/or time of the meeting has changed, then the user may not read other information about the updated meeting request (such as the materials required) thereby saving time and increasing the productivity of the invitee. However, if it is indicated that other changes have been made to the meeting request, this may cause the invitees to more carefully review the annotation information to determine what other changes have been made.

In certain recurring situations, additional notes may be provided in connection with certain types of updates to meetings. In this embodiment, a pick list of reasons to provide additional notes is provided in additional notes data field 92. Additional text explaining the additional notes may be provided in additional notes text data field 94. These data fields operate substantially identically to reason-for-update data field 88 and reason-for-update text data field 90.

Figure 5:
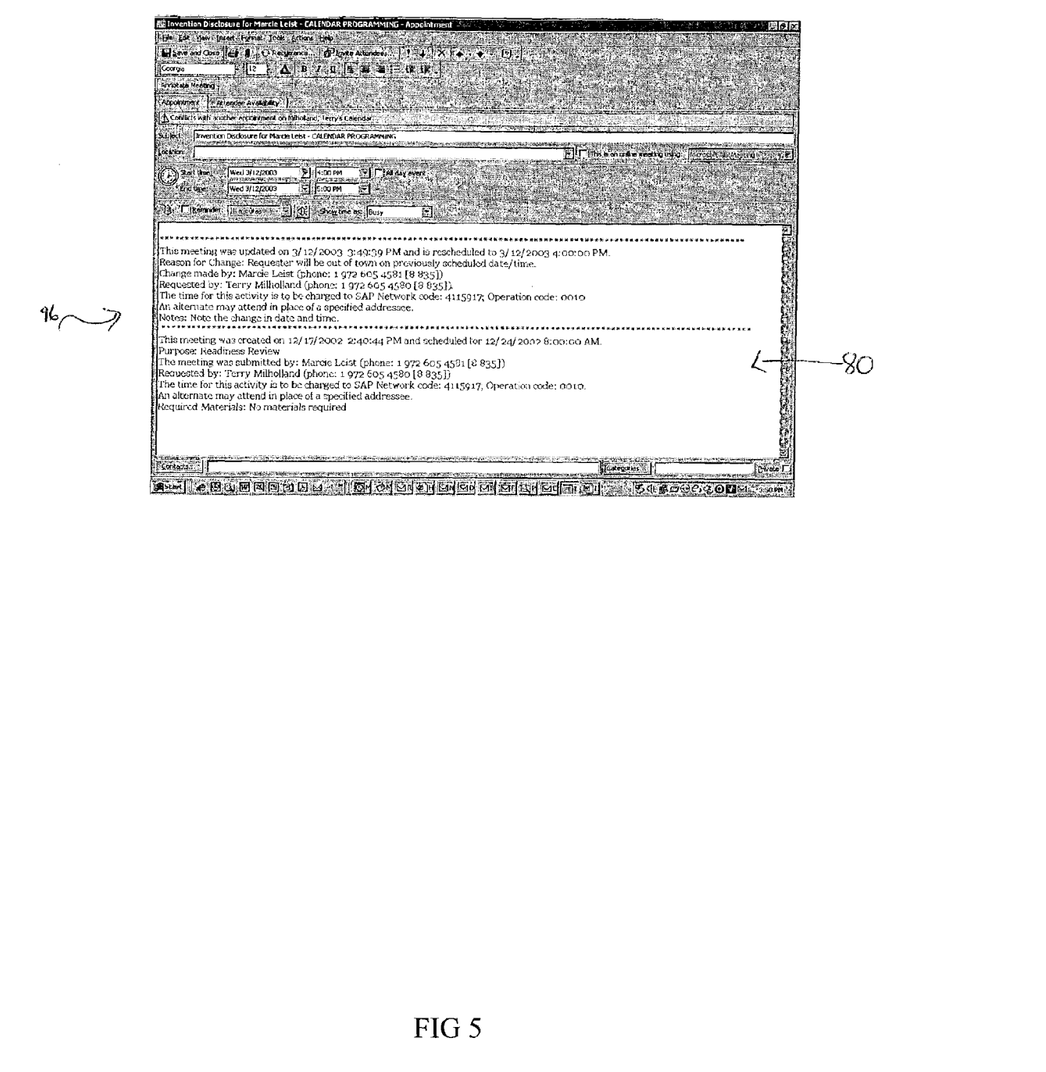
FIG. 5 illustrates an example meeting request with update information that was generated with one embodiment of the invention.

When the user is done entering information on meeting annotation update form 84, then the user may press the OK button. Pressing the OK button will cause the information associated with meeting update annotation form 84 to be included in the text window 80 of updated meeting request form 96 as illustrated in FIG. 5. Meeting request text box 80 on update meeting request form 96 in FIG. 5 also includes the original information that was associated with the original meeting request form. A line of asterisks separates the information from the original meeting form from the information associated with the updated meeting request form. This aspect of the invention may allow a history to be kept of changes made to meeting requests and the reasons for those changes. Accordingly, if a meeting request gets changed a number of times, then invitees to the meeting can look at the history to understand why the meeting has been changed each time it has been changed and determined what has changed. This aspect of the invention may be useful, for example, if higher level management of an organization asks a meeting scheduler or requester why a meeting has been rescheduled multiple times.

In operation, an existing meeting request may be opened and an indication given to the software that the meeting request needs to be updated. The original meeting request may then be opened. The user may press annotate meeting button 42 to open meeting annotation update form 84. The user may then enter information into meeting annotation update form 84. As was the case above, the information on meeting annotation update form 84 could be obtained through a single window or a series of windows. The information could be obtained along with other information concerning update meeting request 96. As was the case above, the information could be entered in any possible order without departing from the scope of the invention. In this embodiment, when the user is finished entering the information into update annotation form 84, he or she may signify the same by pressing the OK button. When the OK button is pressed, the information on update meeting annotation form 84 will be entered as ASCII text in text field 80 of update meeting request form 96.

In this embodiment, a series of asterisks is used to separate the information associated with update meeting annotation form 84 from information that was provided with the original meeting request. Thus, in this embodiment, the information concerning an updated meeting request may be appended to the information associated with the original meeting request. This feature could be omitted without departing from the scope of the invention.

After update meeting request form 96 has been prepared and includes information concerning the updated meeting request (as illustrated in this embodiment in text box 80), then the updated meeting request may be sent to the invitees listed in updated meeting request form 96. In some embodiments, the updated meeting request will be sent as an invitation and the same options as discussed above with respect to an original meeting request sent to a plurality of invitees will apply to the updated meeting request as well. In other embodiments, the updated meeting request may be automatically entered on the calendars of invitees to the meeting. In such an embodiment, the updated information could be merely associated with the updated meeting entered on the electronic calendar or an electronic mail or other type of message could be sent to the invitee indicating that a change has been made to his or her calendar.

Although the present inventions have been described in detail, it should be understood that various changes, substitutions and alterations can be made hereto without departing from the sphere and scope of the inventions as defined by the appended claims.

To aid the Patent Office, and any readers of any patent issued on this application in interpreting the claims appended hereto, Applicants wish to note that they do not intend any of the appended claims to invoke ¶ 6 of 35 U.S.C. §112 as it exists on the date of filing hereof unless "means for" or "step for" are used in the particular claim.

What is claimed is:

1. A scheduling system, comprising:
   a computer-readable storage medium;
   software stored on the computer-readable medium, the software operable to:
     provide an interface to allow a user to input information regarding a meeting;
     provide an alternative attendee data field using the interface to allow a user to provide alternative attendee information, the alternative attendee information indicating whether an invitee to a meeting may send an alternate person to the meeting in place of the invitee;
     provide a privacy setting, using the interface, that is specific to the alternative attendee data field, the privacy setting allowing the user to provide said information regarding a meeting to a group of invitees while selectively preventing other invitees to the meeting from knowing whether a particular invitee to the meeting may send an alternate person to the meeting in place of the particular invitee;
     receive alternative attendee information using the interface; and
     store the alternative attendee information and associate such information with other data concerning the meeting.

2. The scheduling system of claim 1, wherein the interface is a graphical user interface.

3. The scheduling system of claim 1, wherein the alternative attendee information indicates whether or not all invitees to the meeting may each send an alternate person to the meeting.

4. The scheduling system of claim 1, wherein the alternative attendee information is specific to each invitee to the meeting and indicates a first group of the invitees to the meeting that may send an alternate person to the meeting in place of the invitee and a second group of the invitees to the meeting that may not send an alternate person to the meeting in place of the invitee.

5. The scheduling system of claim 1, wherein the software is further operable to send a meeting request to a plurality of invitees to the meeting and wherein the meeting request includes the alternative attendee information.

6. The scheduling system of claim 1, wherein said interface comprises data fields that individually designate both a meeting requester and a meeting scheduler as part of said information regarding a meeting.

7. The scheduling system of claim 6, wherein said software further associates contact information with each of said meeting requester and meeting scheduler in meeting notifications regarding the meeting that are sent to meeting invitees.

8. The scheduling system of claim 1, wherein said interface comprises a data fields for specifying what materials are required for the meeting.

9. The scheduling system of claim 1, wherein said interface comprises a field for billing information with which attendees can bill their time for attendance at the meeting.

10. The scheduling system of claim 1, wherein said software is further operable to send notifications to meeting invitees advising of changes to said information regarding the meeting, said interface comprising a data field for an indicator that indicates whether only date or time information has changed with respect to the meeting when said notification advising of a change is sent.

11. An automated meeting data set, comprising:
    a computer-readable storage medium;
    data stored on the medium comprising information regarding a meeting;
    wherein such data includes:
      alternative attendee information that was obtained from a user through a user interface using an alternative attendee data field, the alternative attendee information indicates whether an invitee to a meeting may send an alternate person to the meeting in place of the invitee; and
      a privacy setting for the alternative attendee data field that was obtained from the user through the user interface, said privacy setting indicating for each attendee individually whether to prevent other invitees to the meeting from knowing whether a particular invitee to the meeting may send an alternate person to the meeting in place of the particular invitee.

12. The automated meeting data set of claim 11, wherein the alternative attendee information indicates whether or not all invitees to the meeting may each send an alternate person to the meeting.

13. The automated meeting data set of claim 11, wherein the alternative attendee information is specific to each invitee to the meeting and indicates a first group of the invitees to the meeting that may send an alternate person to the meeting in place of the invitee and a second group of the invitees to the meeting that may not send an alternate person to the meeting in place of the invitee.

14. The automated meeting data set of claim 13, wherein the alternative attendee information for a specific invitee is only provided to the specific invitee when the data is sent to the specific invitee.

15. A method for scheduling of a meeting, comprising:
providing an interface to allow a user to input information regarding a meeting into a computer;
providing an alternative attendee data field using the interface to allow a user to provide alternative attendee information, the alternative attendee information indicating whether an invitee to a meeting may send an alternate person to the meeting in place of the invitee;
providing a privacy setting for the alternative attendee data field using the interface, the privacy setting allowing the user, for each invitee individually, to set an indication to prevent other invitees to the meeting from knowing whether a particular invitee to the meeting may send an alternate person to the meeting in place of the particular invitee;
receiving alternative attendee information using the interface; and
storing the alternative attendee information and associating such information with other data concerning the meeting.

16. The method of claim 15,
wherein the interface is a graphical user interface.

17. The method of claim 15,
wherein the alternative attendee information indicates whether or not all invitees to the meeting may each send an alternate person to the meeting.

18. The method of claim 15,
wherein the alternative attendee information is specific to each invitee to the meeting and indicates a first group of the invitees to the meeting that may send an alternate person to the meeting in place of the invitee and a second group of the invitees to the meeting that may not send an alternate person to the meeting in place of the invitee.

19. The method of claim 18, further comprising:
sending a meeting request to a plurality of invitees to the meeting, wherein the meeting request includes alternative attendee information; and providing the alternative attendee information for a specific invitee only to the specific invitee when the meeting request is sent to the specific invitee.

20. The method of claim 15, further comprising:
sending a meeting request to a plurality of invitees to the meeting wherein the meeting request includes the alternative attendee information.

* * * * *